Dec. 26, 1967 G. A. SPIERING ET AL 3,360,485

SUPERCONDUCTOR HAVING VARIABLE TRANSITION TEMPERATURE

Filed May 6, 1965

Inventors
Glen A. Spiering
Eugene Revolinsky
Donald J. Beerntsen
By Forest C. Sexton
Attorney United States Patent Office 3,360,485

Patented Dec. 26, 1967

3,360,485
SUPERCONDUCTOR HAVING VARIABLE TRANSITION TEMPERATURE

Glen A. Spiering and Eugene Revolinsky, Milwaukee, and Donald J. Beerntsen, Wauwatosa, Wis., assignors to Allis-Chalmers Manufacturing Company, Milwaukee, Wis.

Filed May 6, 1965, Ser. No. 453,747
3 Claims. (Cl. 252—518)

ABSTRACT OF THE DISCLOSURE

A superconducting alloy having the general formula $Nb(Se_{2-x}N_x)$ where N is either sulfur or tellurium and $x$ is a number less than 0.7. The element N, here being an anion, thus occupies selenium lattice sites. The transition temperature of the alloy is inversely proportional to the amount of sulfur or tellurium at a value between 2.0 and 7.0° K.

Figure 1:
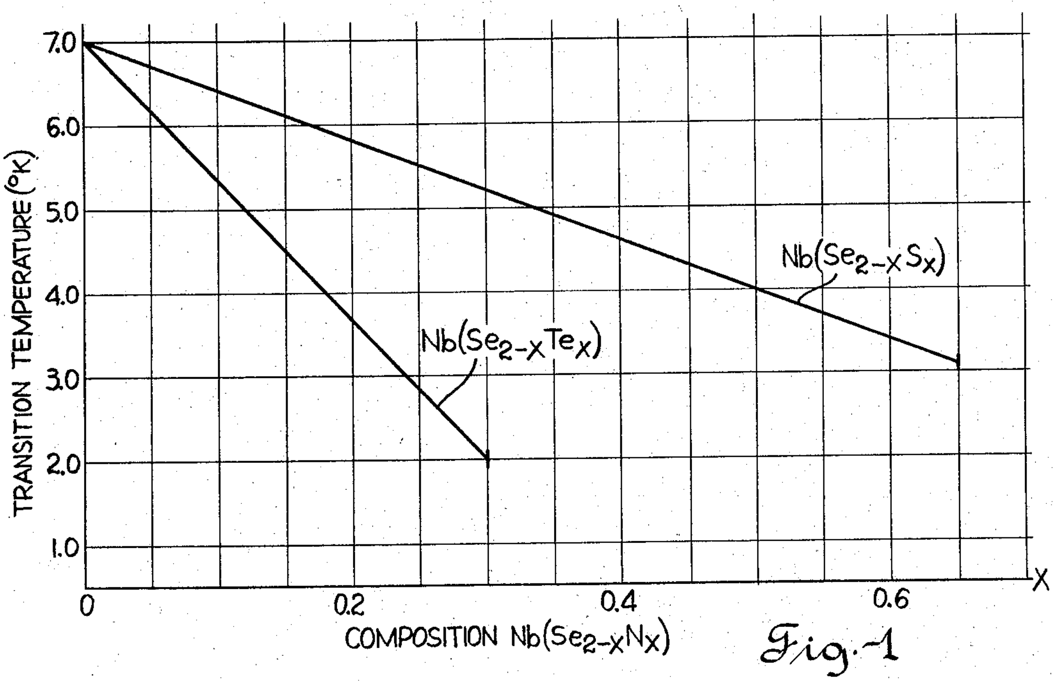

A superconducting alloy having the general formula $(Nb_{1-x}M_x)Se_2$ where M is either tantalum, vanadium, titanium, zirconium, molybdenum or rhenium, and $x$ is a number less than 0.3. The element M here being a cation, thus occupying niobium lattice sites. The transition temperature of the alloy is inversely proportional to the amount of element M at a value between 2.0 and 7.0° K.

This invention relates generally to superconductors. More specifically this invention relates to superconducting niobium diselenide ($NbSe_2$) and alloying additions thereto for effecting a predetermined transition temperature thereof within a range of from about 2 to 7° K.

Superconductivity is perhaps best described as being a thermodynamic state which, at some temperature approaching absolute zero, certain compositions of matter, primarily metals, alloys, and intermetallic compounds, achieve a state characterized by perfect diamagnetism and zero electrical resistivity. Perfect diamagnetism implies the exclusion of magnetic flux from superconductors and a condition of zero electrical resistivity (or infinite conductivity) is self-explanatory.

The transition temperature (often called the critical temperature) is the temperature at which resistance drops to zero. The resistance transition can be very sharp in pure, annealed materials, but often takes place over several tenths of a degree Kelvin in impure and/or deformed materials. All known superconductors have transition temperatures which fall within a range of from a fraction of a degree of absolute zero to 18.2° K. This highest known transition temperature of 18.2° K. is for the intermetallic compound, $Nb_3Sn$.

Although zero electrical resistivity is the most apparent property of a superconductor, the criterion of perfect diamagnetism is more crucial and from it the idea of zero resistivity follows. Perfect diamagnetism implies zero permeability, $\mu$. Permeability is defined as $B/H$ where B is the magnetic flux density at a point in a material or a medium and H is the magnetic field intensity necessary to produce that flux density. Now, if $\mu$ is to be zero, B must be zero because H is finite.

$$B=H+4\pi J$$

where J is the intensity of magnetization. Therefore $$H=-4\pi J$$

for a superconductor. In words, the magnetic field H induces in the superconductor a field equal to itself but opposite in sign. It does this by penetrating the material in a very thin layer at the surface. In this thin surface layer a current is generated whose associated magnetic field is equal to H but opposite in sign. This field of intensity $-4\pi J$ is sufficient to prevent further entry of the flux into the interior. In order for $-4\pi J$ to *exactly* equal H the current responsible for it must be a supercurrent, i.e., there must be zero resistivity. If the external field, H, increases, the screening current increases also until at some critical value, $H_c$, the material reverts to its normal state, the current decays due to resistance, and the external flux enters. At the transition temperature, $T_c$, any finite field is sufficient to make the material normal; therefore, at $T_c$, $H_c$ equals zero. At temperatures less than $T_c$, $H_c$ is greater than zero and reaches a theoretical maximum value as T approaches absolute zero. A superconductor can be made to revert to the normal state at any temperature below its critical temperature if a sufficiently intense magnetic field is applied. For most superconductors the critical field, $H_c$, varies as the square of the absolute temperature divided by the square of the critical temperature in the following manner $$H_c=H_0[1-(T/T_c)^2]$$

where $H_0$ is the critical field at absolute zero. For some high field superconductors $H_c$ appears to vary linearly with temperature but to some extent this is due to the experimental difficulty of having to produce a sufficiently high field in the 100,000–400,000 gauss range to demonstrate nonlinearity.

The magnetic field associated with a transport supercurrent has the same deleterious effect on the superconductive state as does an induced current. For this reason many known superconductors cannot be used to carry extremely large supercurrents because the associated fields are greater than the critical fields.

Although this self-destroying effect is the basic principle utilized in some superconductor applications, this effect helped to discourage some earlier developments in the art because the early known superconductors, principally elements, have low critical fields which severely limit the currents that could be carried. For example, critical field values for some of the early discovered superconductors are from 300 to 1000 gauss even at temperatures within a fraction of a degree of absolute zero. Within the past decade however, the discoveries of many new superconductors having critical fields on the order of 60,000, 100,000 gauss and possibly even 800,000 gauss have stimulated research and development to the point where commercial acceptance is sure to follow.

The superconductors having these high critical field values are all either intermetallic compounds or concentrated alloys, and almost all are characterized by being quite hard and brittle. The superconductors having low critical fields are characterized by being rather soft and ductile since they are primarily elements and dilute alloys. This has resulted in classifying superconductors as being either "soft" superconductors, namely those of low critical fields, and "hard" superconductors being those of high critical field values.

Purity and crystalline irregularities of a superconductor may also greatly affect the critical field and thus greatly affect its current carrying capacity. Severe deformation may enable some superconductors to support much higher currents than possible when the superconductor is in the annealed condition. Accordingly, dislocations have been inferred to be the "filaments" which carry the superconductive current. In fact, it has been possible to deform some superconductors in such a way as to preferentially orient the dislocations in certain direction or plane so that the critical field or current carrying capacity is greatly enhanced in one or more given directions, but not in other directions. The methods used to achieve such anistropic properties are too involved and complex to be given consideration here. It should be mentioned however, that for some superconductor applications it is desirable to have superconductors which possess such anistropic properties.

In our copending patent application, Ser. No. 349,524, we have shown that niobium diselenide ($NbSe_2$) and certain solid solutions thereof are excellent superconducting materials in that they possess relatively high transition temperatures (from about 2.3° K. to about 7.0° K.) and relatively high critical field limits (in excess of 7,000 gauss at 6° K.). These superconductors also have a high degree of anistropic properties in their natural crystalline state without deformation. Furthermore, these superconductors have from 1 to 3 percent ductility which is a substantial improvement over most other "hard" superconducting intermetallic compounds which, as a rule, have no measurable ductility.

This invention is predicated upon our discovery that the transition temperature of niobium diselenide can be controllably varied to any predetermined value between about 2 and 7° K. with proper alloy additions of an element selected from the group consisting of sulfur, tellurium, tantalum, vanadium, titanium, zirconium, molybdenum and rhenium.

It is presently anticipated that superconducting materials having differing transition temperatures will be particularly useful in future devices such as rapid cryogenic switches or cryogenic computer components. It therefore becomes desirable to be able to alter and control the transition temperature of superconductors in compliance with the requirements of any given device. Thus, the alloying additions listed above can be used to reduce the transition temperature of niobium diselenide to any desired level between about 2 and 7° K. and still permit the superconductor to retain its unique anistropic properties.

Accordingly, it is a primary object of this invention to provide a method of controllably varying the transition temperature of niobium diselenide.

It is another object of this invention to provide various alloying additions to niobium diselenide which will render any desirable transition temperature within the range of from about 2 to about 7° K.

It is still another primary object of this invention to provide a variety of superconducting materials having predetermined transition temperatures within the range of from about 2 to about 7° K.

Figure 2:
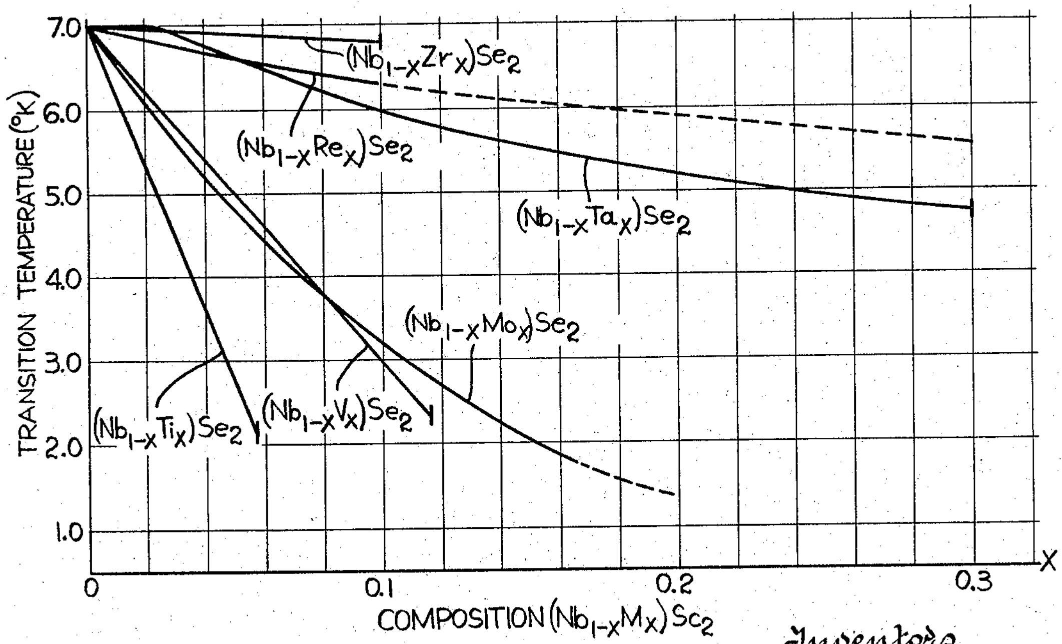

These and other objects and advantages, as shall become apparent, are fulfilled by this invention as can be discerned from a careful consideration of the following detailed description especially when read in conjunction with the accompanying drawings in which:

FIG. 1 is a graph showing the variance of the transition temperature of the two layer repeat niobium diselenide, $NbSe_2$, effected by anion alloying additions; and FIG. 2 is a graph showing the variance in transition temperatures of the two layer niobium diselenide, $NbSe_2$, effected by cation alloy additions.

With reference to our patent application Ser. No. 349,524, it is noted that the unalloyed niobium diselenide does not have one fixed transition temperature. Rather the transition temperature of the unalloyed niobium diselenide is dependent upon which of the two possible crystalline phases the niobium diselenide possesses, and the relative amounts of selenium and niobium.

Accordingly, the intermetallic compound, niobium diselenide, can be formed in either of two crystalline phases. These phases are (1) a hexagonal "two layer repeat" structure of the $NbS_2$ type where $a$=3.44 A., $C$=12.54 A.; and (2) a hexagonal "four layer repeat" structure where $a$=3.44 A., $C$=25.24 A. The transition temperatures for these two structures, where the stoichiometry is exactly $NbSe_2$, are 7.0° K. and 6.0° K. respectively. Because of the desire for the greatest possible range in transition temperatures, only the two layer structure, with the higher transition temperature (7.0° K.) will be further considered for a base material.

It should be further noted that the transition temperature of this intermetallic compound can be varied substantially by slight deviations in the $NbSe_2$ stoichiometry. Thus, if the two layer structure is increasingly made niobium rich, up to $Nb_{1.05}Se_2$ the transition temperature is progressively reduced to about 2.3° K. On the other hand, there appears to be no stable compositions with selenium contents higher than $NbSe_2$.

Although it has been shown above that the transition temperature of niobium diselenide can be altered to predetermined levels between about 2.3 and 7° K. by slight increases in the niobium content, the shift in transition temperatures is quite severe for even minute changes in niobium concentration. Therefore, altering the niobium content in unalloyed niobium diselenide would not be a very desirable method of effecting a predetermined transition temperature. Furthermore, the transition temperatures for compositions between $Nb_{1.05}Se_2$ are not well established, and reproducible results are not easily attained because of the difficulty in controlling composition and the great difference in transition temperature effected by only slight differences in composition.

Referring to the attached drawings, it is seen that alloy additions of sulfur, tellurium, tantalum, vanadium, titanium, zirconium, molybdenum, or rhenium to the two layer repeat niobium diselenide directly effects, in varying degrees, the transition temperature of the intermetallic compound. There is a gradual generally straight line dependency so that superconductors having predetermined transition temperatures can be easily produced with reasonable accuracy.

For the most part, the two graphs shown in the drawings are self-explanatory, directly indicating the effects on the transition temperature of the two layer repeat niobium diselenide (with no niobium enrichment) as a function of the quantity of the respective alloying additions. It should be noted that the quantities of the respective alloy additions are expressed as stoichiometric proportions within the given formula $NbSe_2$, wherein the alloy addition replaced either selenium or niobium depending upon whether the alloy ion addition acts as an anion or cation in the crystal lattice.

Since accuracy in effecting the predetermined transition temperature is of utmost importance, and since it may be desirable to have the greatest possible variance in transition temperature, only the two layer repeat $NbSe_2$, with no niobium enrichment, is considered. Although the four layer repeat structure will be similarly affected by the various alloy additions, the overall transition temperature will be substantially lower because of the low transition temperature of the four layer repeat structure.

Referring particularly to FIG. 1, the effects of the two anions, sulfur and tellurium are shown. Since sulfur and tellurium are anions which locate in selenium lattice sites, they are shown separately from the other alloy additions claimed which are cations assuming niobium lattice sites. The sulfur and tellurium additions produce a composition having the general formula $Nb(Se_{2-X}N_X)$ where N is either the sulfur or tellurium alloy, and X indicates its concentration. As shown on the graph, X should always be less than 0.7 (or about a 22 mole percent concentration) in order to obtain a single phase composition. Examination of FIG. 1 reveals that the addition of sulfur to the two layer niobium diselenide, in quantities up to about 22 mole percent ($NbSe_{1.35}S_{0.65}$) will effect reductions in the transition temperature linearly from 7.0 to 3.1° K. On the other hand, additions of tellurium in quantities up to about 10 mole percent ($NbSe_{1.7}Te_{0.3}$) will effect linearly reductions in transition temperature from 7.0 to 2.0° K.

Referring to FIG. 2, it is noted that alloy additions of tantalum, vanadium, titanium, zirconium, molybdenum or rhenium will similarly effect reductions in transition temperature. These alloy additions will produce a composition having the general formula $(Nb_{1-X}M_X)\ Se_2$ where M is the cation alloy addition and X is a number less than 0.3 to effect concentrations of less than 10 mole percent. Specifically, additions of tantalum in quantities up to about 10 mole percent $(Nb_{0.7}Ta_{0.3}Se_2)$ will effect reductions in transition temperature to about 4.7° K. Similarly, alloy additions in quantities up to 3 mole percent vanadium, 2 mole percent titanium, 3 mole percent zirconium, 3 mole percent molybdenum, or 10 mole percent rhenium will effect reductions in transition temperature to about 3.0, 2.7, 6.7, 3.2 and 5.4° K. respectively.

The terminal points on the graphic lines in FIGS. 1 and 2 is the practical limit for the given alloy addition. That is to say, the alloy additions in quantities as shown in the two figures, will form a single phase solid solution with the niobium diselenide by assuming lattice sites within the intermetallic compound as noted above These single phase solid solutions, being superconductors, possess transitions temperatures which are directly dependent upon the quantity of alloy addition present. Excessive alloy additions beyond the solubility limits indicated in the two figures by the small vertical bars, will result in the formation of more than one phase, and accordingly unpredictable superconducting properties or no superconductivity. The material will usually consist of a mixture of superconducting, and nonsuperconducting phases. Therefore, it is desirable for the purposes of this invention that the solubility limits for the respective alloy additions, as shown in the two graphs, should not be exceeded. Those alloy additions for which solubility limits are not shown have practical limitations being less than the solubility limit because of exceeding low transition temperatures.

It is apparent that the operator, in making niobium diselenide superconductors, will have a wide choice of alloy additions in effecting predetermined transition temperatures. The alloy addition chosen will of course depend upon the desired transition temperature and the degree of accuracy necessary. Thus, if great reductions in transition temperature below the 7.0° K. maximum are desired, then the more effective alloys such as molybdenum, titanium or vanadium would be more desirable. On the other hand, if only minute reductions on transition temperature are desired with more emphasis on accuracy, then the lesser effective alloys such as zirconium, rhenium or tantalum would be more desirable. The ease with which the superconductor can be synthesized may also be an important consideration since compositions alloyed with cations are harder to synthesize. This however, will be further discussed below.

PREPARATION

A polycrystalline form of the compositions is prepared by sealing stoichiometric amounts of the powdered elements into an evacuated quartz ampoule. The ampoule is then heated to a temperature in the range of from 500 to 800° C. for a period of at least 300 hours. If the ampoule is heated to temperatures in excess of about 850° C., the four layer repeat structures will be formed which will have transition temperatures different from those predicted by FIGS. 1 and 2. After heating, the powdered product may be air quenched.

Since some of the anions used possess relatively high vapor pressures, the preparation temperature should be carefully controlled to avoid exceeding the pressure limitations of the ampoule. Such a control can be maintained by a two-zone furnace with the hot zone sintering the reactants and the cold zone used to regulate the vapor pressure. The hot zone should of course be at a temperature of from 500 to 800° C. (850 to 1000° C. if the four layer structure is desired). The starting temperature of the cold zone will depend upon the vapor pressure of the respective anion, but should be so regulated as to provide a pressure of not more than one atmosphere in the ampoule. After holding the cold zone at its starting temperature for about 24 hours, it can then be raised in increments of 150–200° C. per 24 hour period until the cold zone temperature equals that of the hot zone. Both zones should then be maintained at the reaction temperature for about 200 hours to complete the reaction. Thereafter the product may be air quenched. The total time for such a heating process would be about 300 hours.

When alloying the cation niobium site with tantalum or molybdenum, a somewhat different procedure must be followed because the alloying elements tend to combine with the selenium to form $TaSe_2$ or $MoSe_2$. Thus, it is usually necessary to combine the cation elements first. This may be done by arc melting the respective cation tantalum, or molybdenum with the necessary amount of niobium in a partial pressure of helium. The resultant metal slug should then be homogenized and annealed at a temperature of from 1500 to 1900° C. depending on the alloy melting point in a vacuum of at least $1\times10^{-5}$ mm. Hg for a period of at least 4 hours. The resulting metal will be a solid solution of niobium and the respective addition. The metal can then be powdered and mixed with elemental selenium to follow the procedure described above.

Single crystals may be prepared by vapor transport methods. Such a reaction basically involves the vaporization of the polycrystalline compound or the constituent elements at a given temperature $T_1$, by forming a volatile chemical intermediate. Then, utilizing the temperature dependence of the chemical equilibrium, the desired compound is formed at another given temperature, $T_2$. The procedure involves sealing into an evacuated quartz ampoule a quantity of elemental halogens (iodine or bromine) and the polycrystalline form of the desired material (produced as shown above) or stoichiometric combinations of the necessary elements. However, when sulfur additions are desired, it will be necessary to use the combined polycrystalline form because the elemental sulfur would have excessive vapor pressures. The ampoule is then placed in a gradient furnace with all the reactants at one end of the ampoule maintained at 900 to 1000° C. The other end of the ampoule, being empty, is maintained at 500 to 900° C. Transportation will take place from the hot to the cold end in from 75 to 100 hours.

The quantity of halogen used will depend upon the desired rate of transportation and the pressure capacity of the ampoule. Excessive quantities should be avoided since rapid transportation may result in poor crystal growth and the partial pressures of the halogens may be excessive enough to rupture the ampoule. Too small a quantity will delay the transportation reaction. As a rule of thumb, no more than 100 milligrams of iodine per cubic centimeter of volume in the ampoule should be satisfactory.

The single crystals grow in a thin platelike shape the plane of which is perpendicular to the c-axis.

To aid in a fuller understanding of this invention, the following examples are given to specifically show how the superconducting materials are produced. These examples are meant only to be exemplary and should not limit the scope of this invention.

*Example I*

$(Nb_{.9}Zr_{.1})Se_{2.01}$ was prepared by initially combining the metal cations in a vacuum arc-melter under a partial pressure of helium. The ingot was homogenized and annealed at 1700° F. for 4 hours. The metal alloy was then filed to obtain a fine mesh. Into a quartz tube was placed 2.213 gm. of the 90% Nb-10% Zr alloy and 3.787 gm. selenium. The tube, which was outgassed to remove the water vapor, was ⅝" O.D. x ½" I.D. x 6". The tube was then evacuated and the constituents sealed within. The polycrystalline $NbSe_2$ alloy was obtained by firing at 760° C. for 300 hours. The alloy compound was X-rayed and found to be 2-layer $NbSe_2$. The superconducting transition temperature (Tc) was measured at 6.7° K., ±0.1° K.

*Example II*

$(Nb_{.95}Mo_{.05})Se_{2.01}$ was prepared by firing 2.217 gm. of a 95% Nb-5% Mo alloy and 3.782 gm. selenium at 760° C. for 300 hours. The cation metals were previously combined and the quartz tube outgassed as described in Example I. The polycrystalline alloy-compound was X-rayed and shown to have the 2-layer repeat structure. Tc measured at 4.91° K., ±0.1° K.

*Example III*

$(Nb_{.9}Ta_{.1})Se_{2.03}$ was prepared by firing 1.941 gm. of a 90% Nb-10% Ta alloy and 3.059 gm. selenium at 650° C. for 300 hours (temperature lowered to increase solubility). The cation metals were previously combined and the quartz tube outgassed as described in Example I. X-ray analysis showed the material to have the 2-layer repeat structure. Tc measured at 5.9° K., to the same accuracy.

*Example IV*

$(Nb_{.9}V_{.1})Se_2$ was prepared by firing a mixture of 3.390 gm. niobium, 0.207 gm. vanadium, and 6.403 gm. selenium at 760° C. in an evacuated quartz tube. X-ray analysis showed the material to have the 2-layer repeat structure. Tc measured at 3.44° K.

*Example V*

$(Nb_{.7}Re_{.3})Se_2$ was prepared by firing a mixture of 2.333 gm. niobium, 2.004 gm. rhenium, 5.664 gm. selenium at 760° C. in an evacuated quartz tube. X-ray analysis showed the material to have the 2-layer repeat structure. Tc measured at 5.47° K.

*Example VI*

$(Nb_{.95}Ti_{.05})Se_2$ was prepared by firing a mixture of 2.598 gm. niobium, 1.093 titanium, and 6.309 gm. selenium at 760° C. in an evacuated quartz tube. X-ray analysis showed the material to have the 2-layer repeat structure. Tc measured at 2.78° K.

*Example VII*

$Nb(Se_{1.95}Te_{.05})$ was prepared by placing a mixture of 7.337 gm. of niobium powder, 12.159 gm. selenium pellets, and 0.503 gm. tellurium chips into a quartz tube which had been outgassed to remove the water vapor. Dimensions of the tube were ⅝" O.D. x ½" I.D. x 6". The tube was then evacuated and the constituents sealed within. The materials were fired at 760° C. for 300 hours the result of which was a 2-layer polycrystalline alloy-compound verified by X-ray analysis. The superconducting transition temperature (Tc) was measured at 6.5° K., ±0.1° K.

*Example VIII*

$Nb(Se_{1.8}S_{.2})$ was prepared by firing a mixture of 3.775 gm. niobium, 6.090 gm. selenium, and 1.131 gm. sulfur at 760° C. in an evacuated quartz tube. The 2-layer polycrystalline alloy-compound was verified by X-rayed analysis. Tc measured at 5.57° K., ±0.1° K.

The embodiments of the invention in which an exclusive property or privilege is claimed are defined as follows:

1. A superconducting composition of matter consisting essentially of a solid solution niobium diselenide and at least one element selected from the group consisting of sulfur and tellurium.

2. A superconducting composition of matter consisting essentially of a solid solution of niobium diselenide and an element selected from the group consisting of sulfur and tellurium in quantities of less than about 22 mole percent.

3. A superconducting composition of matter having the general formula $Nb(Se_{2-X}N_X)$ where N is an anion selected from the group consisting of sulfur and tellurium, and X is a number less than 0.7.

References Cited

UNITED STATES PATENTS

| | | | |
|---|---|---|---|
| 3,197,410 | 7/1965 | Brixner | 252—62.3 |
| 3,295,931 | 1/1967 | Hulliger | 23—315 |

MILTON WEISSMAN, *Primary Examiner.*

OSCAR R. VERTIZ, *Examiner.*

H. S. MILLER, *Assistant Examiner.*